(12) United States Patent
Tanaka et al.

(10) Patent No.: US 8,524,848 B2
(45) Date of Patent: Sep. 3, 2013

(54) CURABLE SILICONE GEL COMPOSITION

(75) Inventors: Miyuki Tanaka, Annaka (JP); Kazuyasu Sato, Annaka (JP); Tsuyoshi Matsuda, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 292 days.

(21) Appl. No.: 13/157,585

(22) Filed: Jun. 10, 2011

(65) Prior Publication Data

US 2011/0306746 A1    Dec. 15, 2011

(30) Foreign Application Priority Data

Jun. 11, 2010  (JP) ................................. 2010-134397

(51) Int. Cl.
*C08G 77/12*  (2006.01)
(52) U.S. Cl.
USPC .............................................. 528/31; 528/32
(58) Field of Classification Search
USPC ....................................................... 528/31, 32
See application file for complete search history.

(56) References Cited

U.S. PATENT DOCUMENTS

| | | | | |
|---|---|---|---|---|
| 5,446,087 A | * | 8/1995 | Chizat et al. ................... | 524/588 |
| 2009/0082517 A1 | | 3/2009 | Tanaka et al. | |

FOREIGN PATENT DOCUMENTS

| | | |
|---|---|---|
| EP | 2 039 722 A2 | 3/2009 |
| JP | 63-280766 | 11/1988 |
| JP | 2510577 | 4/1996 |
| JP | 2849027 | 11/1998 |

OTHER PUBLICATIONS

Extended European Search Report issued on Oct. 27, 2011 in the corresponding European Application No. 11004772.7.

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

A curable silicone gel composition that is of low viscosity, exhibits good fluidity, and generates a silicone gel that exhibits good resistance to external stress and thermal stress. The composition includes (A) a specific organopolysiloxane having at least two alkenyl groups within each molecule, (B) an organohydrogenpolysiloxane having a specific branched main chain structure, containing at least three SiH groups within each molecule, and also containing at least one branch-forming unit within each molecule, and (C) a platinum-based catalyst, wherein the cured product has a penetration value of 10 to 200, and loss coefficient values at 25° C. for shear frequency values of 1 Hz and 10 Hz of 0.1 to 1.0 and 0.3 to 1.5 respectively.

10 Claims, No Drawings

CURABLE SILICONE GEL COMPOSITION

BACKGROUND OF THE INVENTION

1. Field of the Invention

The present invention relates to an organopolysiloxane gel composition, which yields a cured product (silicone gel) upon an organopolysiloxane addition reaction, and can be used particularly favorably for protecting ICs and hybrid ICs, and for encapsulating power modules and the like.

2. Description of the Prior Art

Silicone gel compositions are addition reaction-curable organopolysiloxane compositions, which comprise an organohydrogenpolysiloxane having hydrogen atoms bonded to silicon atoms (namely, SiH groups), an organopolysiloxane having alkenyl groups such as vinyl groups bonded to silicon atoms, and a platinum-based catalyst, and which yield a cured product via an addition reaction of the SiH groups to the alkenyl groups such as vinyl groups. The silicone gels of these cured products exhibit excellent levels of heat resistance, weather resistance, oil resistance, cold resistance and electrical insulation, and also exhibit low elastic modulus values and low levels of stress, and as a result, they are widely used in the protection of vehicle-mounted electronic components and household electronic appliance components. In recent years, with the ongoing trend towards smaller and lighter electronic componentry, the density of IC components, and the density of the wiring such as wire bonding used to connect these IC components to substrates have continued to increase. Conventional silicone gel compositions are of comparatively low viscosity, and therefore tend to exhibit favorable flow properties, but the obtained silicone gels lack resistance to the types of deformations caused by external stresses such as vibrations, and internal stresses caused by the expansion and contraction that accompany variations in temperature, and have been known to suffer from gel rupture or internal cracking.

Examples of compositions in which the above-mentioned organohydrogenpolysiloxane has a branched main chain structure have already been disclosed in JP 2,510,577 B (Patent Document 1) and JP 2,849,027 B (Patent Document 2), but all of the gels disclosed in these documents exhibit a penetration value as prescribed in JIS K-6249 that exceeds 200, meaning that if subjected to a large amount of stress, the gel is prone to rupture.

[Patent Document 1] JP 2,510,577 B
[Patent Document 2] JP 2,849,027 B

SUMMARY OF THE INVENTION

The present invention has been developed in light of the circumstances described above, and has an object of providing a curable silicone gel composition that is of comparatively low viscosity, exhibits good fluidity, and generates a silicone gel cured product that exhibits good resistance to external stress and thermal stress.

As a result of intensive investigation aimed at achieving the above object, the inventors of the present invention discovered that a silicone gel composition described below exhibited good fluidity, and yielded a gel that had a low penetration value, was resistant to thermal stress, and exhibited good crack resistance.

In other words, the present invention provides, as an aspect capable of achieving the above object, a curable silicone gel composition comprising:

(A) 100 parts by mass of an organopolysiloxane represented by an average composition formula (1) shown below:

$$R_a R^1_b SiO_{(4-a-b)/2} \quad (1)$$

(wherein R represents an alkenyl group, $R^1$ represents a substituted or unsubstituted monovalent hydrocarbon group that contains no aliphatic unsaturated bonds, a represents a number within a range from 0.0001 to 0.2 and b represents a number within a range from 1.7 to 2.2, provided that a+b is a number within a range from 1.9 to 2.4),
containing at least two alkenyl groups bonded to silicon atoms within each molecule, (B) an organohydrogenpolysiloxane represented by an average composition formula (2) shown below:

$$(HR^2_2SiO_{1/2})_c(R^3_3SiO_{1/2})_d(R^4_2SiO)_e(R^5SiO_{3/2})_f \quad (2)$$

(wherein $R^2$ to $R^5$ represent identical or different substituted or unsubstituted monovalent hydrocarbon groups that contain no aliphatic unsaturated bonds, c and d each independently represents a number within a range from 0.00001 to 0.3, e represents a number within a range from 0.5 to 0.98, and f represents a number within a range from 0.01 to 0.12, provided that c+d+e+f=1),
containing at least three hydrogen atoms bonded to silicon atoms within each molecule, and containing at least one $(R^5SiO_{3/2})$ unit within each molecule,
in an amount that provides 0.1 to 5 hydrogen atoms bonded to silicon atoms per one alkenyl group bonded to a silicon atom within component (A), and (C) an effective amount of a platinum-based catalyst, wherein
following curing, the penetration value as prescribed in JIS K-6249 is within a range from 10 to 200, and the loss coefficient values at 25° C. for shear frequency values of 1 Hz and 10 Hz are within a range from 0.1 to 1.0 and within a range from 0.3 to 1.5 respectively.

The curable silicone gel composition of the present invention has a low viscosity, and can therefore flow readily into narrow gaps and the like, and upon curing, yields a low-stress silicone gel. This gel suffers no gel rupture even when exposed to the types of deformations caused by external stresses such as vibrations, and internal stresses caused by the expansion and contraction that accompany variations in temperature. Accordingly, the curable silicone gel composition can be used particularly favorably for protecting ICs, hybrid ICs and power modules and the like.

DETAILED DESCRIPTION OF THE PREFERRED EMBODIMENTS

The composition of the present invention comprises the components (A) to (C) described above, and may also comprise other optional components. Each of these components is described below in further detail. In this description, viscosity values refer to values measured at 25° C. using a BM-type rotational viscometer.

[(A) Organopolysiloxane]

The component (A) in the composition of the present invention functions as the main constituent (base polymer) of the composition. The component (A) is an organopolysiloxane represented by the above average composition formula (1) that contains at least two alkenyl groups bonded to silicon atoms (hereinafter also referred to as "silicon atom-bonded alkenyl groups") within each molecule. The number of these alkenyl groups within each molecule is preferably within a range from 2 to 50, and is more preferably from 2 to 20. The alkenyl groups may be bonded solely to silicon atoms at the molecular chain terminals, solely to silicon atoms at non-terminal positions within the molecular chain (namely, positions other than the molecular chain terminals), or may also be bonded to both these types of silicon atoms.

In the above average composition formula (1), R represents an alkenyl group in which the number of carbon atoms is typically within a range from 2 to 6, and preferably from 2 to 4. Specific examples of this alkenyl group include lower alkenyl groups such as a vinyl group, allyl group, propenyl group, isopropenyl group, butenyl group and isobutenyl group, and a vinyl group is particularly preferred. $R^1$ represents a substituted or unsubstituted monovalent hydrocarbon group containing no aliphatic unsaturated bonds, in which the number of carbon atoms is typically within a range from 1 to 10, and preferably from 1 to 6. Specific examples of $R^1$ include alkyl groups such as a methyl group, ethyl group, propyl group, isopropyl group, butyl group, isobutyl group, tert-butyl group, pentyl group, hexyl group, octyl group, decyl group or dodecyl group, cycloalkyl groups such as a cyclohexyl group, aryl groups such as a phenyl group or tolyl group, aralkyl groups such as a benzyl group or phenylethyl group, and groups in which some or all of the hydrogen atoms within one of these unsubstituted hydrocarbon groups have been substituted with a halogen atom such as a fluorine atom or chlorine atom, such as a chloromethyl group or 3,3,3-trifluoropropyl group. From the viewpoint of ease of synthesis and the like, a methyl group, phenyl group or 3,3,3-trifluoropropyl group is preferred.

In the average composition formula (1), a is a number within a range from 0.0001 to 0.2, and is preferably a number from 0.0005 to 0.1. b is a number within a range from 1.7 to 2.2, and is preferably a number from 1.9 to 2.0. The value of a+b is a number within a range from 1.9 to 2.4, and is preferably a number from 1.95 to 2.05.

The molecular structure of the organopolysiloxane of this component may be a linear structure, a branched structure comprising $RSiO_{3/2}$ units, $R^1SiO_{3/2}$ units and/or $SiO_2$ units (wherein the groups represented by R and $R^1$ are as defined above), a cyclic structure, or a three dimensional network (resin-like) structure, provided that the value of a+b satisfies the range described above, although typically, the organopolysiloxane is a linear diorganopolysiloxane in which the main chain basically comprises repeating diorganosiloxane units represented by a formula: $R'_2SiO_{2/2}$ (wherein R' includes both R and $R^1$) with both molecular chain terminals blocked with triorganosiloxy groups.

The viscosity at 25° C. of the organopolysiloxane of this component is preferably within a range from 50 to 100,000 mPa·s, and is more preferably from 100 to 10,000 mPa·s. Provided this viscosity is within the range from 50 to 100,000 mPa·s, the strength, fluidity and workability of the resulting cured product are superior.

Examples of the organopolysiloxane of the component (A) include compounds represented by general formula (1a) shown below:

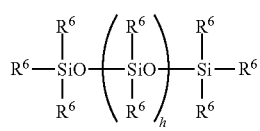

(1a)

(wherein each $R^6$ group independently represents a substituted or unsubstituted monovalent hydrocarbon group, provided that at least two of the $R^6$ groups are alkenyl groups (and examples of $R^6$ include the alkenyl groups listed above for R in formula (1) and the substituted or unsubstituted monovalent hydrocarbon group containing no aliphatic unsaturated bonds listed above for $R^1$ in formula (1)), and h represents an integer within a range from 20 to 1,500).

Furthermore, h is preferably an integer within a range from 40 to 1,000, and is more preferably from 50 to 600.

Specific examples of the organopolysiloxane represented by the above general formula (1a) include dimethylpolysiloxane with both molecular chain terminals blocked with dimethylvinylsiloxy groups, dimethylpolysiloxane with one molecular chain terminal blocked with a trimethylsiloxy group and the other molecular chain terminal blocked with a dimethylvinylsiloxy group, copolymers of dimethylsiloxane and methylvinylsiloxane with both molecular chain terminals blocked with trimethylsiloxy groups, copolymers of dimethylsiloxane and methylvinylsiloxane with one molecular chain terminal blocked with a trimethylsiloxy group and the other molecular chain terminal blocked with a dimethylvinylsiloxy group, copolymers of dimethylsiloxane and methylvinylsiloxane with both molecular chain terminals blocked with dimethylvinylsiloxy groups, and copolymers of dimethylsiloxane and diphenylsiloxane with both molecular chain terminals blocked with dimethylvinylsiloxy groups.

The organopolysiloxane of this component may use either a single material or a combination of two or more different materials.

[(B) Organohydrogenpolysiloxane]

The component (B) of the composition of the present invention is an essential component of the present invention, and functions as a cross-linking agent that reacts with the above component (A). The component (B) is represented by the above average composition formula (2). In this formula, c and d are each independently a number within a range from 0.00001 to 0.3, preferably from 0.0001 to 0.25, and more preferably from 0.0005 to 0.2, e is a number within a range from 0.5 to 0.98, preferably from 0.6 to 0.97, and more preferably from 0.7 to 0.95, and f is a number within a range from 0.01 to 0.12, preferably from 0.015 to 0.1, and more preferably from 0.02 to 0.08, provided that c+d+e+f=1. Each molecule of the component (B) contains at least three units positioned at molecular terminals that have a hydrogen atom bonded to a silicon atom, represented by a formula: $HR^2_2SiO_{1/2}$ (M units), and at least one branch-forming unit represented by a formula: $R^5SiO_{3/2}$. In other words, the hydrogen atoms bonded to silicon atom exist only at molecular chain terminals, no hydrogen atoms bonded to silicon atoms exist within side chains, and the organohydrogenpolysiloxane includes at least one branch-forming unit represented by the formula: $R^5SiO_{3/2}$.

In general formula (2), if c is less than 0.00001, then obtaining a silicone gel is difficult, whereas if c exceeds 0.3, then the resistance of the cured product to thermal stress tends to deteriorate. Further, if f is less than 0.01, then obtaining a silicone gel is difficult, whereas if f exceeds 0.12, then density irregularities tend to occur at the cured product surface, resulting in a non-uniform product.

There are no particular restrictions on the molecular structure of the component (B), provided that it satisfies the requirements described above, and the component may be synthesized using conventional methods.

The viscosity at 25° C. of the organohydrogenpolysiloxane of the component (B) is typically within a range from 1 to 10,000 mPa·s, is preferably from 3 to 2,000 mPa·s, and is more preferably from 10 to 1,000 mPa·s, and the component is ideally a liquid at room temperature (25° C.).

In the average composition formula (2), $R^2$ to $R^5$ each represents a substituted or unsubstituted monovalent hydrocarbon group containing no aliphatic unsaturated bonds, in which the number of carbon atoms is typically within a range from 1 to 10, and preferably from 1 to 6. Specific examples of these groups include alkyl groups such as a methyl group, ethyl group, propyl group, isopropyl group, butyl group, isobutyl group, tert-butyl group, pentyl group, neopentyl group, hexyl group, octyl group, nonyl group or decyl group, cycloalkyl groups such as a cyclohexyl group, aryl groups such as a phenyl group, tolyl group, xylyl group or naphthyl group, aralkyl groups such as a benzyl group, phenylethyl group or phenylpropyl group, and groups in which some or all of the hydrogen atoms within one of these unsubstituted hydrocarbon groups have been substituted with a halogen atom such as a fluorine atom or chlorine atom, such as a 3,3,3-trifluoropropyl group. Of these, an alkyl group, aryl group or 3,3,3-trifluoropropyl group is preferred, and a methyl group, phenyl group or 3,3,3-trifluoropropyl group is particularly desirable.

Specific examples of the organohydrogenpolysiloxane represented by the above formula (2) include copolymers composed of $(CH_3)_2HSiO_{1/2}$ units, $(CH_3)_2SiO$ units and $CH_3SiO_{3/2}$ units, copolymers composed of $(CH_3)_2HSiO_{1/2}$ units, $(C_6H_5)_2SiO$ units, $(CH_3)_2SiO$ units and $CH_3SiO_{3/2}$ units, copolymers composed of $CH_3C_6H_5HSiO_{1/2}$ units, $(CH_3)_2SiO$ units and $CH_3SiO_{3/2}$ units, copolymers composed of $(CH_3)_2HSiO_{1/2}$ units, $(CH_3)_2SiO$ units and $C_6H_5SiO_{3/2}$ units, copolymers composed of $(CH_3)(CF_3C_2H_4)HSiO_{1/2}$ units, $(CH_3)(CF_3C_2H_4)SiO$ units and $CH_3SiO_{3/2}$ units, copolymers composed of $(CH_3)(CF_3C_2H_4)HSiO_{1/2}$ units, $(CH_3)(CF_3C_2H_4)SiO$ units, $(CH_3)_2SiO$ units and $CH_3SiO_{3/2}$ units, copolymers composed of $(CH_3)_2HSiO_{1/2}$ units, $(CH_3)(CF_3C_2H_4)SiO$ units and $CH_3SiO_{3/2}$ units, copolymers composed of $(CH_3)_2HSiO_{1/2}$ units, $(CH_3)(CF_3C_2H_4)SiO$ units, $(CH_3)_2SiO$ units and $CH_3SiO_{3/2}$ units, and copolymers composed of $(CH_3)_2HSiO_{1/2}$ units, $(CH_3)(CF_3C_2H_4)SiO$ units, $(CH_3)_2SiO$ units and $CF_3C_2H_4SiO_{3/2}$ units.

The organohydrogenpolysiloxane of the component (B) may use either a single material or a combination of two or more different materials.

The blend amount of the component (B) is an amount that provides 0.1 to 5, preferably 0.2 to 3, hydrogen atoms bonded to silicon atoms within the component (B) per one alkenyl group bonded to a silicon atom within the component (A). Moreover, the blend amount of the component (B) per 100 parts by mass of the component (A) is typically within a range from 0.1 to 200 parts by mass, preferably from 1 to 50 parts by mass. If the number of hydrogen atoms bonded to silicon atoms within the component (B) is too large relative to the number of alkenyl groups bonded to silicon atoms in the component (A), then the time-stability of a cured product may be poor or the surface of the cured product may be sticky, whereas if the number is too small, then curability may be poor.

[(C) Platinum-Based Catalyst]

The component (C) of the composition of the present invention is a component for accelerating the addition reaction between the silicon atom-bonded alkenyl groups within the component (A) and the silicon atom-bonded hydrogen atoms groups within the component (B). The component (C) is a platinum-based catalyst, or more specifically, either platinum and/or a platinum-based compound.

This platinum and/or platinum-based compound can employ conventional materials, and specific examples include platinum black, chloroplatinic acid, alcohol-modified products of chloroplatinic acid, and complexes of chloroplatinic acid with olefin aldehydes, vinylsiloxanes or acetylene alcohols.

The blend amount of the component (C) need only be sufficient to ensure effective activity as a hydrosilylation reaction catalyst, and can be increased or decreased in accordance with the desired curing rate. A typical amount, calculated as the mass of platinum atoms relative to the mass of the component (A), is within a range from 0.1 to 1,000 ppm, and amounts from 1 to 300 ppm are preferred. If this amount is too small, then the addition reaction slows markedly, and the composition may not cure at all. In contrast, if the amount is too large, then not only does the heat resistance of the cured product tend to deteriorate, but the high cost of the platinum makes the composition unviable from a cost perspective.

The platinum-based catalyst of this component may use either a single material or a combination of two or more different materials.

The silicone gel composition of the present invention can be used for protecting, encapsulating or filling electrical and electronic components, and upon curing, yields a silicone gel that exhibits a penetration value within a range from 10 to 200. This penetration value is preferably at least 20 and more preferably 30 or greater, and is preferably not more than 100 and more preferably not more than 80. The loss coefficient at 25° C. and 1 Hz is within a range from 0.1 to 1.0, is preferably at least 0.15 and more preferably 0.2 or greater, and is preferably not more than 0.8. The loss coefficient at 25° C. and 10 Hz is within a range from 0.3 to 1.5, is preferably at least 0.4 and more preferably 0.5 or greater, and is preferably not more than 1.2 and more preferably not more than 1.0. If the penetration value is less than 10 or the loss coefficient at 1 Hz is less than 0.1, then the silicone gel composition may be unable to withstand the stresses during curing, resulting in damage to portions of the electronic circuitry or the occurrence of cracks within the silicone gel. If the penetration value exceeds 200 or the loss coefficient at 10 Hz exceeds 1.5, then a silicone gel with satisfactory shape retention capabilities cannot be obtained, and the silicone gel is prone to leaking off the circuit.

[Other Optional Components]

In addition to the components (A) through (C) described above, other optional components may also be included within the composition of the present invention, provided they do not impair the actions and effects of the present invention.

Examples of the optional components include reaction retarders, inorganic fillers, heat resistance-imparting agents, flame retardancy-imparting agents, thixotropic agents, pigments, dyes, and organopolysiloxanes that contain neither silicon atom-bonded hydrogen atoms nor silicon atom-bonded alkenyl groups (that is, organopolysiloxanes other than the components (A) and (B)).

Reaction retarders are components for retarding the reaction of the above composition, and examples include conventional acetylene-based reaction retarders, amine-based reaction retarders, and ester-based reaction retarders such as carboxylate ester-based and phosphite ester-based reaction retarders.

Examples of inorganic fillers include fumed silica, crystalline silica, precipitated silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber, as well as the above types of inorganic fillers that have undergone a hydrophobic surface treatment with an organosilicon compound such as an organoalkoxysilane compound, organochlorosilane compound, organosilazane compound or low molecular weight siloxane compound, and also silicone rubber powders and silicone resin powders. These optional components may be used either alone, or in combinations of two or more different components.

[Method of Preparing Composition]

The composition of the present invention can be prepared by mixing each of the components described above using normal methods. The composition of the present invention may either be prepared as a one-pot composition, or may be divided into two, or even three or more parts, if required. For example, in the case of a two-pot composition, the composition may be divided into a part composed of a portion of the component (A) and the component (C), and a part composed of the remainder of the component (A) and the component (B). Optional components may be blended with either part. The composition of the present invention may be cured either at ambient temperature (typically a temperature within a range from 0 to 30° C.), or under heated temperature conditions within a range from 40 to 200° C. depending on the intended application.

EXAMPLES

Specifics of the present invention are described below using a series of examples and comparative examples, although the present invention is in no way limited by the examples presented below. In the examples below, the units "parts" and "%" refer to "parts by mass" and "% by mass" respectively. Furthermore, the penetration values listed for the silicone gel cured products represent values measured in accordance with JIS K6249, whereas the viscosity values represent values measured at 25° C. using a BM-type rotational viscometer.

Example 1

100 parts of a dimethylpolysiloxane with both molecular chain terminals blocked with dimethylvinylsiloxy groups and having a viscosity of 600 mPa·s, 16.5 parts of a copolymer of dimethylhydrogensiloxane, trimethylsiloxane, dimethylsiloxane and methylsiloxane, having a viscosity of 80 mPa·s and represented by an average composition formula (5) shown below:

$$(H(CH_3)_2SiO_{1/2})_5((CH_3)_3SiO_{1/2})_{0.3}((CH_3)_2SiO)_{100}(CH_3SiO_{3/2})_3 \quad (5)$$

(wherein the ratio of the number of silicon atom-bonded hydrogen atoms within the component (B) per silicon atom-bonded alkenyl group within the component (A) (hereinafter abbreviated as H/Vi) was 0.69), 0.05 parts of a dimethylpolysiloxane solution of a chloroplatinic acid-vinylsiloxane complex containing 1% by mass of platinum atoms, and 0.005 parts of 1-ethynylcyclohexanol were mixed together uniformly, yielding a composition 1. When this composition 1 was cured by heating at 120° C. for 30 minutes, a silicone gel with a penetration value of 70 was obtained.

Example 2

100 parts of a dimethylpolysiloxane-diphenylpolysiloxane with both molecular chain terminals blocked with dimethylvinylsiloxy groups, having a viscosity of 3,000 mPa·s and represented by an average composition formula (6) shown below:

$$[CH_2=CH-(CH_3)_2Si-O]_2-[(CH_3)_2SiO]_{340}-[(C_6H_5)_2SiO]_{18} \quad (6)$$

17 parts of a copolymer of dimethylhydrogensiloxane, trimethylsiloxane, dimethylsiloxane and methylsiloxane, having a viscosity of 190 mPa·s and represented by an average composition formula (7) shown below:

$$[H(CH_3)_2SiO_{1/2}]_7-[(CH_3)_3SiO_{1/2}]_{0.7}-[(CH_3)_2SiO]_{200}-[CH_3SiO_{3/2}]_4 \quad (7)$$

(wherein H/Vi was 1.10), 0.05 parts of a dimethylpolysiloxane solution of a chloroplatinic acid-vinylsiloxane complex containing 1% by mass of platinum atoms, and 0.01 parts of 1-ethynylcyclohexanol were mixed together uniformly, yielding a composition 2. When this composition 2 was cured by heating at 120° C. for 30 minutes, a silicone gel with a penetration value of 36 was obtained.

Comparative Example 1

With the exception of replacing the 16.5 parts of the copolymer of dimethylhydrogensiloxane, trimethylsiloxane, dimethylsiloxane and methylsiloxane represented by the formula (5) used in Example 1 with 3.3 parts of a copolymer of dimethylsiloxane and methylhydrogensiloxane with both terminals blocked with trimethylsiloxy groups, having a viscosity of 100 mPa·s and represented by an average composition formula (8) shown below:

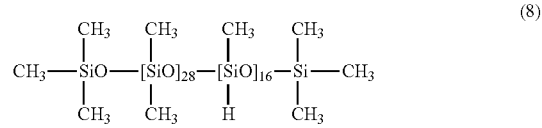

(8)

(wherein H/Vi was 1.2), a composition 3 was obtained in the same manner as Example 1. When this composition 3 was cured by heating at 120° C. for 30 minutes, a silicone gel with a penetration value of 5 was obtained.

Comparative Example 2

With the exception of altering the amount used of the copolymer of dimethylsiloxane and methylhydrogensiloxane with both terminals blocked with trimethylsiloxy groups represented by the formula (8) to 1.0 parts (meaning H/Vi was 0.35), a composition was prepared and cured in the same manner as Comparative Example 1, yielding a silicone gel with a penetration value of 61.

Comparative Example 3

With the exception of replacing the 16.5 parts of the copolymer of dimethylhydrogensiloxane, trimethylsiloxane, dimethylsiloxane and methylsiloxane represented by the formula (5) used in Example 1 with 14.1 parts of a copolymer of trimethylsiloxane, methylhydrogensiloxane, dimethylsiloxane and methylsiloxane, having a viscosity of 85 mPa·s and represented by an average composition formula (9) shown below:

$$((CH_3)_3SiO_{1/2})_7(H(CH_3)SiO)_6((CH_3)_2SiO)_{80}(CH_3SiO_{3/2})_3 \quad (9)$$

(wherein H/Vi was 0.80), a composition was prepared and cured in the same manner as Example 1, yielding a silicone gel with a penetration value of 55.

Evaluation of Loss Coefficient

Each of the five compositions obtained in the above examples and comparative examples was cured by heating at 120° C. for 30 minutes in a RheoGel E4000 (slit shear method) manufactured by UBM Co., Ltd. Following cooling of the resulting cured product to 25° C., the loss coefficient values at 1 Hz and 10 Hz were measured by a rheometer (tradename: ARES) manufactured by TA Instruments.

Evaluation of Thermal Shock Resistance (1) Using each of the five compositions obtained in the above examples and comparative examples, 12 g of the composition was placed in a test tube (diameter: 14 mm, length: 105 mm), and the composition was then cured by heating at 120° C. for 30 minutes. Inspection of the external appearance of the thus obtained cured products revealed no gas bubbles or cracking in any of the cured products from the examples and comparative examples.

Subsequently, each test tube containing a cured product was left to stand at room temperature (25° C.) for 100 hours, and the external appearance of the cured product was then once again inspected for the existence of gas bubbles and/or cracking.

(2) Test tubes containing cured products prepared in the same manner as (1) above were subjected to 100 thermal shock cycles, wherein each cycle involved (30 minutes at −60° C.)×(30 minutes at 150° C.), and the external appearance of each cured product was then inspected for the existence of gas bubbles and/or cracking.

The results of the above evaluations are shown in Table 1.

TABLE 1

| | | Example 1 | Example 2 | Comparative example 1 | Comparative example 2 | Comparative example 3 |
|---|---|---|---|---|---|---|
| H/Vi | | 0.69 | 1.10 | 1.20 | 0.35 | 0.8 |
| Penetration | | 70 | 36 | 5 | 65 | 55 |
| Loss coefficient: 1 Hz | | 0.39 | 0.63 | 0.008 | 0.08 | 0.16 |
| Loss coefficient: 10 Hz | | 0.71 | 1.10 | 0.01 | 0.21 | 0.33 |
| Durability tests (existence of gas bubbles, cracking) | After 100 hours at room temperature | No | No | Yes | No | No |
| | After 100 thermal shock cycles | No | No | Yes | Yes | Yes |

[Evaluations]

The compositions of Example 1 and Example 2 satisfied the requirements of the present invention, and yielded silicone gels having good rubber properties. In both the room temperature durability test and the thermal shock cycle durability test, no abnormalities were detected in the gel cured products, confirming that the gels exhibited good stability.

In contrast, in the compositions of Comparative Examples 1 to 3, the organohydrogenpolysiloxane of the component (B) did not satisfy the requirements of the present invention, and in each case, gas bubbles and/or cracking occurred in either one or both of the room temperature durability test and the thermal shock cycle durability test. The cured product obtained from the composition of Comparative Example 2 exhibited a similar penetration value to that of the cured products of the examples, but suffered from gas bubbles and cracking after the durability test.

Based on the above results it is clear that it is only when the requirements of the present invention are satisfied that a curable silicone gel composition can be obtained that is capable of suppressing the occurrence of gas bubbles and cracking within the cured product.

The composition of the present invention is useful for protecting ICs and hybrid ICs, and for encapsulating power modules and the like.

What is claimed is:

1. A curable silicone gel composition comprising:
   (A) 100 parts by mass of an organopolysiloxane represented by an average composition formula (1) shown below:

$$R_a R^1_b SiO_{(4-a-b)/2} \quad (1)$$

wherein R represents an alkenyl group, $R^1$ represents a substituted or unsubstituted monovalent hydrocarbon group that contains no aliphatic unsaturated bonds, a represents a number within a range from 0.0001 to 0.2 and b represents a number within a range from 1.7 to 2.2, provided that a+b is a number within a range from 1.9 to 2.4,
   containing at least two alkenyl groups bonded to silicon atoms within each molecule,
   (B) an organohydrogenpolysiloxane represented by an average composition formula (2) shown below:

$$(HR^2_2SiO_{1/2})_c(R^3_3SiO_{1/2})_d(R^4_2SiO)_e(R^5SiO_{3/2})_f \quad (2)$$

wherein $R^2$ to $R^5$ each independently represent identical or different substituted or unsubstituted monovalent hydrocarbon groups that contain no aliphatic unsaturated bonds, c and d each independently represents a number within a range from 0.00001 to 0.3, e represents a number within a range from 0.5 to 0.98, and f represents a number within a range from 0.01 to 0.12, provided that $c+d+e+f=1$,
   containing at least three hydrogen atoms bonded to silicon atoms within each molecule, and containing at least one ($R^5SiO_{3/2}$) unit within each molecule,
   in an amount that provides 0.1 to 5 hydrogen atoms bonded to silicon atoms per one alkenyl group bonded to a silicon atom within component (A), and
   (C) an effective amount of a platinum-based catalyst, wherein
   following curing, a penetration value as prescribed in JIS K-6249 is within a range from 10 to 200, and loss coefficient values at 25° C. for shear frequency values of 1 Hz and 10 Hz are within a range from 0.1 to 1.0 and within a range from 0.3 to 1.5 respectively.

2. The curable silicone gel composition according to claim 1, wherein in the average composition formula (1), a is a number within a range from 0.0005 to 0.1, b is a number within a range from 1.9 to 2.0, and the value of a+b is a number within a range from 1.95 to 2.05.

3. The curable silicone gel composition according to claim 1, wherein the organopolysiloxane of component (A) is represented by a general formula (1a) shown below:

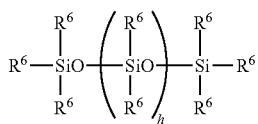 (1a)

wherein each $R^6$ group independently represents a substituted or unsubstituted monovalent hydrocarbon group, provided that at least two of the $R^6$ groups are alkenyl groups, and h represents an integer within a range from 20 to 2,000.

4. The curable silicone gel composition according to claim 1, wherein the organopolysiloxane of the component (A) has 2 to 50 alkenyl groups bonded to silicon atoms within each molecule.

5. The curable silicone gel composition according to claim 1, wherein the alkenyl groups bonded to silicon atoms are vinyl groups.

6. The curable silicone gel composition according to claim 1, wherein the organopolysiloxane of the component (A) has a viscosity at 25° C. of 1 to 10,000 mPa·s.

7. The curable silicone gel composition according to claim 1, wherein in the average composition formula (2) representing the component (B), c and d are each independently a number within a range from 0.0001 to 0.25, e is a number within a range from 0.6 to 0.97, and f is a number within a range from 0.015 to 0.1.

8. The curable silicone gel composition according to claim 1, wherein the viscosity at 25° C. of the organohydrogenpolysiloxane of the component (B) is within a range from 1 to 10,000 mPa·s.

9. The curable silicone gel composition according to claim 1, wherein the amount of the component (B) is within a range from 0.1 to 200 parts by mass per 100 parts by mass of component (A).

10. The curable silicone gel composition according to claim 1, wherein the penetration value is within a range from 20 to 100, and the loss coefficient values at 25° C. for shear frequency values of 1 Hz and 10 Hz are within a range from 0.15 to 0.8 and within a range from 0.4 to 1.2 respectively.

* * * * *